United States Patent
Baldwin et al.

(10) Patent No.: US 11,506,414 B2
(45) Date of Patent: Nov. 22, 2022

(54) INTELLIGENT LOW-VOLTAGE POWER DELIVERY SYSTEM AND METHOD

(71) Applicants: James Armand Baldwin, Palo Alto, CA (US); Gladys Yuan Yan Wong, Fremont, CA (US); Hedley C. Davis, Middletown, DE (US); Peter Ian Macdonald, Redwood City, CA (US); Andrew Walters, Castroville, CA (US)

(72) Inventors: James Armand Baldwin, Palo Alto, CA (US); Gladys Yuan Yan Wong, Fremont, CA (US); Hedley C. Davis, Middletown, DE (US); Peter Ian Macdonald, Redwood City, CA (US); Andrew Walters, Castroville, CA (US)

(73) Assignee: Domatic, Inc., Palo Alto, CA (US)

( * ) Notice: Subject to any disclaimer, the term of this patent is extended or adjusted under 35 U.S.C. 154(b) by 90 days.

(21) Appl. No.: 17/175,699

(22) Filed: Feb. 15, 2021

(65) Prior Publication Data
US 2021/0270489 A1  Sep. 2, 2021

Related U.S. Application Data

(60) Provisional application No. 62/977,679, filed on Feb. 17, 2020.

(51) Int. Cl.
*F24F 11/63* (2018.01)
*F24F 11/00* (2018.01)
*G05B 15/02* (2006.01)
*H02J 13/00* (2006.01)
*H05B 47/175* (2020.01)

(52) U.S. Cl.
CPC .......... *F24F 11/63* (2018.01); *F24F 11/0001* (2013.01); *G05B 15/02* (2013.01); *H02J 13/00002* (2020.01); *H05B 47/175* (2020.01)

(58) Field of Classification Search
CPC ....... F24F 11/63; F24F 11/0001; G05B 15/02; G05B 2219/163; G05B 2219/2642; H02J 13/00002; H02J 13/00004; H02J 2213/10; H02J 13/00026; H02J 2310/12; H02J 1/08; H02J 13/00007; H05B 47/175; H05B 47/115; H05B 47/185; G06Q 50/06; Y02B 20/40
See application file for complete search history.

(56) References Cited

U.S. PATENT DOCUMENTS

| | | | |
|---|---|---|---|
| 7,215,088 B1 * | 5/2007 | Clark | H05B 47/18 315/312 |
| 10,573,106 B1 * | 2/2020 | Brady | G06V 40/1365 |
| 11,376,002 B2 * | 7/2022 | Shelton, IV | A61B 17/07207 |
| 2010/0237695 A1 * | 9/2010 | Covaro | H05B 47/185 307/31 |
| 2014/0314062 A1 * | 10/2014 | Loebs | H04L 12/2816 370/338 |
| 2016/0219679 A1 * | 7/2016 | Snyder | H05B 45/12 |
| 2018/0110105 A1 * | 4/2018 | Guzik | H05B 47/19 |
| 2018/0145844 A1 * | 5/2018 | Pera | H04L 12/2803 |

(Continued)

*Primary Examiner* — Ramesh B Patel
(74) *Attorney, Agent, or Firm* — Larisa Migachyov

(57) ABSTRACT

A system for delivering power and data over a single wire via a hub, wherein the hub can control and power multiple low-power Class 2 circuits. The hub can be controlled remotely through a computing device such as a mobile phone or a computer.

12 Claims, 3 Drawing Sheets

(56) References Cited

U.S. PATENT DOCUMENTS

| | | | |
|---|---|---|---|
| 2018/0240322 A1* | 8/2018 | Potucek | E04H 4/14 |
| 2018/0279429 A1* | 9/2018 | Sadwick | H05B 45/3725 |
| 2019/0097421 A1* | 3/2019 | Davis | H02J 1/08 |
| 2019/0098723 A1* | 3/2019 | Sadwick | F21K 9/272 |
| 2020/0007960 A1* | 1/2020 | Campbell | H04W 4/38 |
| 2020/0294401 A1* | 9/2020 | Kerecsen | G05D 1/0287 |
| 2021/0336807 A1* | 10/2021 | Boemi | H02J 9/061 |
| 2022/0086988 A1* | 3/2022 | Coleman | H05B 47/16 |

\* cited by examiner

INTELLIGENT LOW-VOLTAGE POWER DELIVERY SYSTEM AND METHOD

CROSS-REFERENCE TO RELATED APPLICATIONS

The present application takes priority from Provisional App. No. 62/977,679, filed Feb. 17, 2020, which is incorporated herein by reference.

BACKGROUND

Electrical wiring in buildings has not substantially changed for almost 100 years. There are significant problems associated with high-voltage electrical wiring; it is dangerous, it requires time-consuming inspections, and it requires a skilled electrician to install.

As technology advances, many fixtures (LED lights, fans, sensors) no longer require high voltages to run. Therefore, wiring an entire building with high-voltage electrical wiring is overkill; a 5-watt fixture does not require a 2000-watt circuit. Furthermore, since these fixtures are running on low-voltage DC power, wiring a building with high-voltage AC power will require AC-DC conversion for every DC device. Some energy is lost in the conversion process, whether it is from AC to DC or from one DC voltage to another. The efficiency of this conversion varies from 90% to 60%-70% or even less, especially when the AC-DC conversion is at low power levels. This becomes a real problem if AC power is used throughout a building and every device does its own AC-DC conversion. Each of the devices will suffer a 30-40% power conversion loss due to accepting AC power at low power levels. This adds up to a significant energy loss across a building.

The widespread acceptance of green technology is another reason why high-voltage electrical wiring may be a bad idea. Since solar/battery systems deliver DC power, wiring a building for AC high-voltage will lead to unnecessary conversions and conversion inefficiencies.

Furthermore, many fixtures and appliances require control signals. Currently, a smart appliance may be controlled wirelessly via a Wi-Fi network, while power is provided separately via an AC wiring system. However, this adds another level of complexity and another point of failure.

A need exists for a simple, low-voltage method of providing power to fixtures in a building that can also provide control signals in the same circuit.

LIST OF FIGURES

SUMMARY OF THE INVENTION

Figure 1:
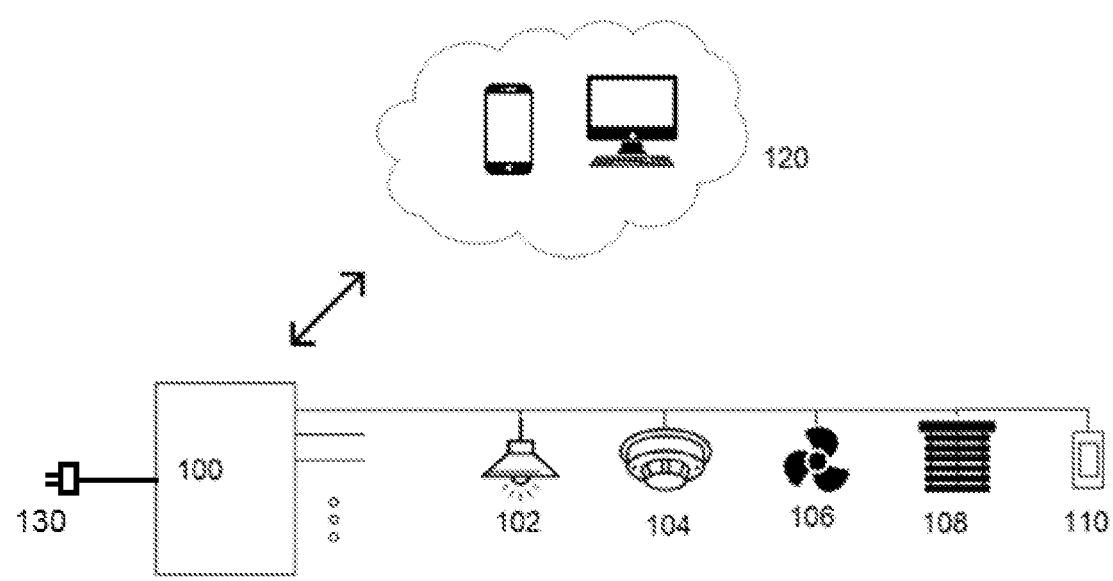
FIG. 1 shows an overview of an embodiment of the system of the present invention.

An object of the present invention is to provide a system that distributes low power DC wiring to low-voltage fixtures located in a building, without the need for standard voltage wiring throughout the building.

Another object of the present invention is to provide a system that enables control of low-voltage fixtures over power lines without a separate data connection.

Another object of the present invention is to provide a system that provides power and control signals to low-voltage fixtures over the same low-power cables.

The system of the present invention, in an embodiment, comprises a hub. The hub comprises a standard-voltage power input for supplying power to the system, and a plurality of low-voltage outputs that are connected to low-voltage fixtures. Each low-voltage fixture is configured to accept power and data input over the same connection. The hub also comprises a communication interface for communicating with a computing device such as a phone or a computer, and an application processor that can receive control signals through the communication interface and encode data signals in the power signals delivered via at least one of the output connections. The application processor may also collect analytics information regarding the usage of low-voltage fixtures and transmit that information to a computing device via the communication interface. Such analytics information may include the timing of fixture usage, the type of usage, amount of power used, any parameters set by the user, trends in power usage over time, and so on.

The standard-voltage power input preferably comprises a voltage between 110-250V, and may be alternating current. The output connections preferably each comprise a current limiter to limit current to 1.66 A, and may comprise direct current, and each output connection is connected to a low-voltage fixture with a low-voltage cable.

In an embodiment, the hub creates an IP subnet for each output connection and provisions each output connection with an IP address.

In an embodiment, one of the fixtures may be a switch connected to the hub rather than to another fixture. The hub then receives signals from the switch and uses those signals to control another fixture.

In an embodiment, one of the fixtures may be a controller, connected to the hub rather than to another fixture. The hub then receives information from the controller and uses that information to control another fixture.

In an embodiment, one of the fixtures may be a light fixture, and the hub may be configured to transmit a control signal to the light fixture over an output connection in order to change the light fixture's color or light intensity.

In an embodiment, one of the fixtures may be a fan, and the hub may be configured to transmit a control signal to the fan over an output connection to change the fan's speed. The fan may comprise an integrated motor driver with PWM output and counter input.

In an embodiment, one of the fixtures may be a sensor, and the hub may be configured to receive data from the sensor via an output connection connected to the sensor. The hub then transmits information derived from the sensor to a computing device via the communication interface.

DETAILED DESCRIPTION OF THE PREFERRED EMBODIMENT

The below description discloses a system comprising a hub that provides power and data to at least one low-power fixture. It will be clear, however, that the present invention may be practiced without some or all of the specific details disclosed. In other instances, well-known processes, operations, or devices have not been described in detail in order to not unnecessarily obscure the present invention.

For purposes of the present disclosure, a "computing device" is a computer, smartphone, tablet, or any other similar device. A "low-voltage fixture" is any device that can be powered by a low-voltage power input and that may be installed in a building, such as a light, a fan, a sensor, blinds, a switch, or any other device that uses low power and that may be installed in a building. The list of low-voltage fixtures in this disclosure or in the Figures is not meant to be limiting and any other low-voltage device may also be used to practice the present invention.

FIG. 1 shows a high-level diagram of the system of the present invention. Hub 100 is connected to standard-voltage power input 130. A number of output connections are also connected to the hub; each output connection is connected to a low-voltage fixture 102-110. The low-voltage fixtures may be lights 102, sensors 104, fans 106, blinds 108, or switches/controllers 110, or any other fixtures that may be run on low-voltage DC power. In an embodiment, as shown in the Figure, some fixtures may be grouped, and a group of fixtures may be connected to a Class 2 (100 watt) circuit.

At least one, and preferably all, of the low-voltage fixtures are configured to accept data and power connections over the same wire, by adding a modulated carrier signal to the power delivered. This simplifies the wiring required for the system and reduces the wireless signals used in the building. Any power-line communication technique may be used for practicing the present invention, and any frequency band may be used; the present invention is not limited to a particular communication protocol or a particular frequency band. In the preferred embodiment, broadband OFDM modulation is used to deliver or receive data signals to or from a low-voltage fixture over the power line; in alternative embodiments, wavelet modulation may be used. In an embodiment, the communication protocol used to deliver or receive data signals is HD-PLC, or High Definition Power Line Communication. This is an IEEE 1901-based standard that is used for wired communication using a high-frequency band over a wired medium such as powerlines, twisted pair, and coaxial cables; it uses uplinking/downlinking through 432 or 26 MHz bandwidth subcarriers, and allows for multilevel modulation for each subcarrier. In alternate embodiments, other communication protocols may be used. Data signals may include sensor data if the low-voltage fixture is a sensor; switch activation or inactivation data if the low-voltage fixture is a switch; controller input data if the low-voltage fixture is a controller; light control signals for a light fixture, such as dimming or color change signals; speed control signals for a fan; opening/closing control signals for automatic blinds; and so on.

Figure 2:
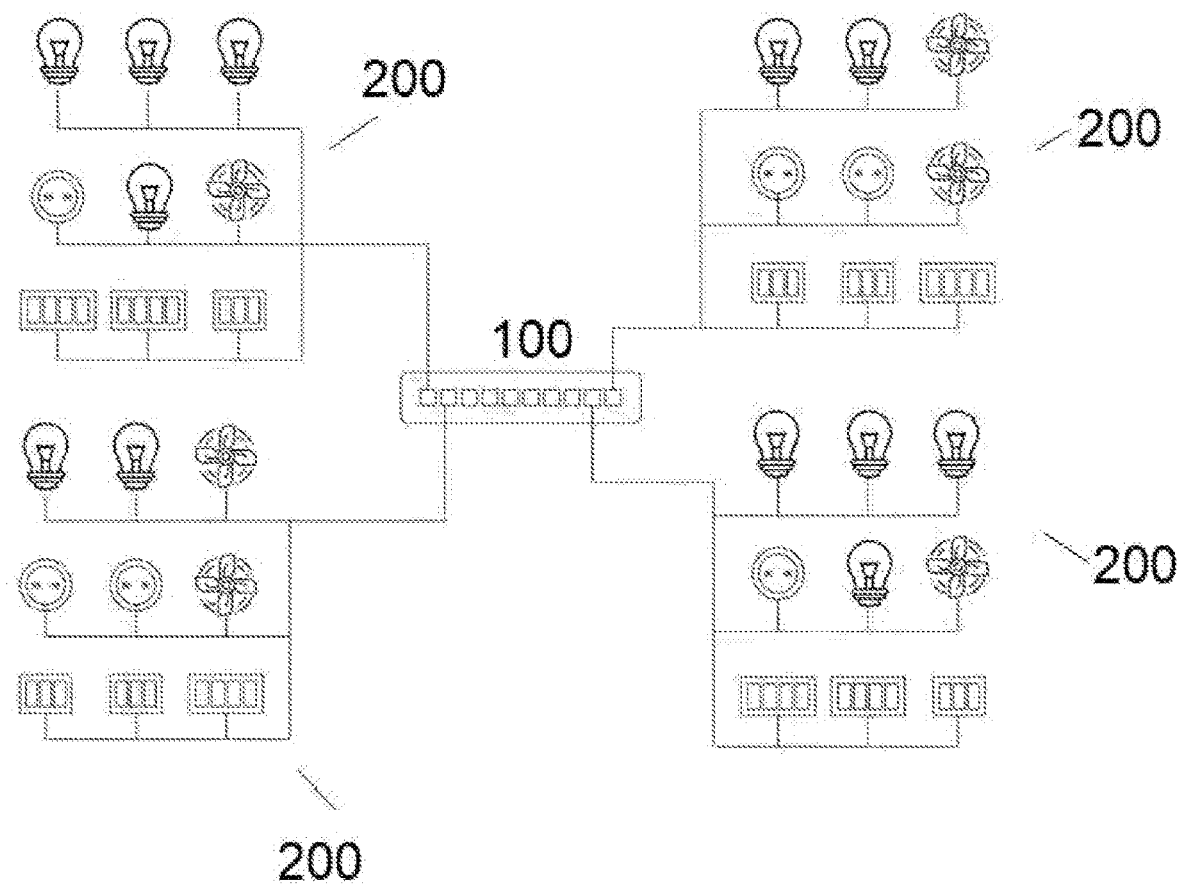
FIG. 2 shows a view of an embodiment of the hub connected to a plurality of fixtures in a building.

The fixtures are preferably grouped into a plurality of Class 2 (100 watt) circuits to simplify wiring. FIG. 2 shows a diagram of the hub 100 connected to four groups connected into Class 2 circuits 200, each of which comprises a plurality of different fixtures. Each group is then connected to the hub. Because the circuits are low-voltage DC, it does not require a home run, and it is OK to daisy-chain the circuits. Also, it is not necessary to route the power through switches; the switches can connect directly to the hub and control the corresponding fixture through the hub. This simplifies wiring installation.

In an embodiment, the installation of the hub is very simple. Only one high-power connection needs to be installed—namely, the connection of the hub to an external standard-voltage power source. Any low-power electrical fixtures are then connected to the hub via Class 2 (100 watt) circuits via low-voltage cables; so, the wiring throughout the building does not need to be high voltage wiring, but may be entirely low-voltage cables. In an embodiment, the low-voltage cable can be a single 16-AWG pair of wires; field-terminated or pre-terminated cable kits may be provided in an embodiment of the present invention. It is to be understood that any other low-voltage cable may be used for practicing this aspect of the present invention.

Figure 3:
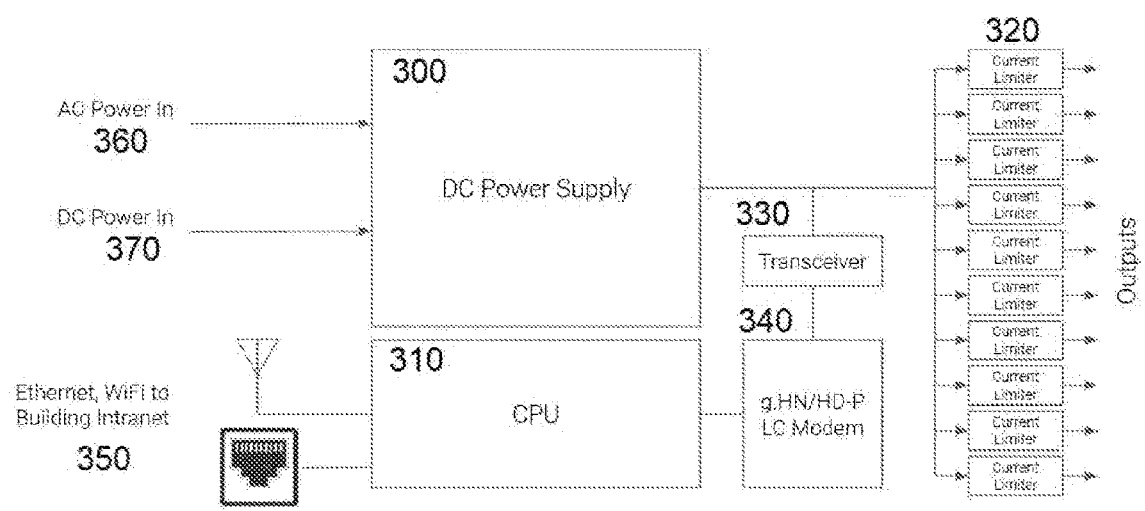
FIG. 3 shows a block diagram of the power hub.

FIG. 3 shows a block diagram of an embodiment of the power hub. In this embodiment, the hub comprises an application processor 310, which is connected to flash memory and RAM (not shown). The application processor 310 is also connected to a communications interface 350, comprising a WiFi radio and an Ethernet interface in the depicted embodiment. The communications interface 350 is used to communicate control signals to the hub, and to communicate usage and analytics data from the hub. In an embodiment, only a WiFi radio may be used; in another embodiment, only an Ethernet interface may be used; and in alternate embodiments, an entirely different wireless or wired communications protocol may be used for the communications interface.

The standard voltage power input 360 is preferably 110-250 v AC, 50/60 Hz, but it is to be understood that any input power may be used for practicing the present invention. It is preferably the standard AC voltage used to provide power to a building. In an embodiment, the voltage power input may be a DC input 370, such as the input from a solar panel or a battery system; the DC input may be the only input or it may be one of two inputs as shown in the Figure. The hub adapts the DC input voltage to the desired output voltage in the same way as it adapts the AC input voltage.

The applications processor 300 is connected to a modem 340 and a transceiver 350 as shown. The modem 340 is preferably a g.HN/HD-P LC modem as shown, but may be any other modem of similar parameters and capabilities. The modem 340, through the transceiver 330, controls the data signals that are then transmitted via the power lines to the outputs 380. The transceiver 330 is preferably a HD-PLC or g.HN transceiver, depending on the communication protocol used. The output connections 380 provide low-voltage DC power and data signals to the low-voltage fixtures. In the embodiment shown, each output connection 380 is also connected through a current limiter 320 as shown, to limit the current to 1.66 A, meeting NEC class 2 safety requirements. A data network is established on each output 380, preferably supporting 1023 devices each, though any other number of devices is also consonant with the present invention.

The power hub preferably creates an IP subnet for each class 2 circuit. Any number of class 2 circuits may be present. Each node (light fixture, fan, sensor, switch, or other fixture) is provisioned by the hub with an IP address (DHCP). The API's are implemented via REST (HTTP/TCP/IP) endpoints.

The power/data is preferably carried on general "CM" (communications multipurpose) cabling. The cabling can be CMR (riser) or CMP (plenum) rated as needed.

Each fixture for use with the power hub is preferably configured to accept input power from the power hub, preferably has an input voltage range of 48-60 v, and has a data connection to the hub over the same wire in which power is carried. Each fixture is implicitly connected and hardwired with a data network, requiring no wireless provisioning and allowing easy interoperability. The devices are preferably grouped into device classes for easy interoperability; classes may be defined as switches, lights, sensors, fans, and so on; it is to be understood that any number of classes and any class definitions may be used with the present invention.

The following will discuss some of the individual types of fixture to be used with the present invention, with the understanding that the descriptions are not meant to be limiting and that other types of fixture may also be used.

One type of fixture to be used with the present invention is an LED light fixture. In an embodiment, the light fixture comprises an LED driver that is a drop-in replacement for a fixture's AC/DC adapter common in LED light fixtures. The LED driver may comprise constant-current outputs for driving up to 4 LED chains, which thus supports variable color-temperature devices. The LED driver may also provide pulse-width modulation at 3 kHz for no-flicker dimming.

Another type of fixture to be used with the present invention is a fan. In an embodiment, a fan driver may be connected to the power hub of the present invention. The fan driver is preferably a drop-in replacement for the AC/DC adapter of a fan. The fan driver preferably comprises an integrated motor driver with PWM output, and a plus counter input for precise speed control.

Another type of fixture to be used with the present invention is a dimmer switch. The dimmer switch may comprise an LED indicator for dim level. The dimmer switch, or a standard binary switch, may be used to control another fixture connected to the hub. Since all the controls for the various fixtures are virtual, this simplifies wiring and installation; there is no need to run the power line for a particular fixture through a switch that will control it. Each fixture, and each switch, is connected directly to the hub. This makes it easy to install each fixture and to wire the building.

Another type of fixture to be used with the present invention is various types of sensor. Some of the sensors used with the present invention may be occupancy, temperature, humidity, or moisture sensors. The sensors preferably send data through the hub to a computing device via the communications interface. In an embodiment, sensor data may be used by the computing device to control another fixture; for example, an occupancy sensor may send data to the computing device, which then may trigger a light fixture to turn on when people are present in the room.

While the low-power fixtures are preferably configured to accept data over a power line and to be hardwired to be part of a data network, other fixtures may also be used with the present invention. In an embodiment, an adapter may be provided to connect a fixture to the output connection in such a way as to enable the hub to control the fixture. In an embodiment, a smoke detector may be connected to the power hub via an adapter. The adapter terminates the bus power and data network and drives the required voltage of the fixture, as well as providing any control signals. For example, a smoke detector may need a 12 v input and may need to send an alarm state signal. The adapter would provide the 12 v input and would be configured to receive the alarm state signal from the smoke detector and convert it to a data signal in a format that can be interpreted by the hub. Other devices may also be connected to the hub via an adapter; the present disclosure is not meant to be limiting as to the type of device with which an adapter may be used.

It is understood that the above disclosure describes merely an illustrative embodiment of the present invention, and that reasonable equivalents to the above-described elements may be apparent to a person of reasonable skill in the art.

The invention claimed is:

1. A system, comprising:
a standard-voltage power input for supplying power to the system;
a plurality of fixtures, wherein the fixtures are configured to accept power and data input over the same connection, wherein the fixtures require a voltage distinct from a standard voltage;
a hub, comprising:
an input connection to receive power from the standard-voltage power input;
a plurality of output connections to supply power and data to the plurality of fixtures;
a communication interface for communicating with a computing device;
an application processor, wherein the processor is configured to perform the following actions:
receive control signals through the communication interface;
encode data signals in power delivered via at least one of the plurality of output connections.

2. The system of claim 1, wherein the application processor is further configured to:
collect analytics information;
transmit analytics information to the computing device via the communication interface.

3. The system of claim 1, wherein the standard-voltage power input comprises a voltage approximately between 110 and 250 V.

4. The system of claim 1, wherein the standard-voltage power input comprises alternating current, while each one of the output connections comprises direct current.

5. The system of claim 1, wherein each one of the output connections comprises a current limiter that limits current to 1.66 A, and wherein each one of the output connections is connected to a fixture with a low-voltage cable.

6. The system of claim 1, wherein the processor is further configured:
to create an IP subnet for each output connection;
to provision each output connection with an IP address.

7. The system of claim 1, further comprising:
a switch connected to a first output connection of the plurality of output connections;
a fixture connected to a second output connection of the plurality of output connections;
wherein when the switch is activated, the hub triggers the second output connection to be activated;
wherein when the switch is inactivated, the hub triggers the second output connection to be inactivated.

8. The system of claim 1, further comprising:
a controller connected to a first output connection of the plurality of output connections;
a fixture connected to a second output connection of the plurality of output connections;
wherein the hub receives information from the controller and transmits control signals based on the information over the second output connections to the fixture.

9. The system of claim 1, wherein at least one fixture is a light fixture, and wherein the hub is configured to:
transmit a control signal to the light fixture over an output connection connected to the light fixture, wherein the control signal triggers the light fixture to do at least one of the following: to change its color, to dim.

10. The system of claim 1, wherein at least one fixture is a fan, and wherein the hub is configured to:
transmit a control signal to the fan over an output connection connected to the fan,
wherein the control signal triggers the fan to change its speed.

11. The system of claim 10, wherein the fan comprises an integrated motor driver with PWM output and counter input.

12. The system of claim 1, wherein at least one fixture is a sensor, and wherein the hub is configured to:
- receive data from the sensor via an output connection connected to the sensor;
- transmit information derived from the data to the computing device via the communication interface.

\* \* \* \* \*